United States Patent [19]

Shin et al.

[11] Patent Number: 5,994,476
[45] Date of Patent: Nov. 30, 1999

[54] PROCESS FOR THE PREPARATION OF A BLOCK COPOLYMER COMPOSITION

[75] Inventors: Hyeon-Cheol Shin; Jin-Kyung Kim; Jong-Geun Kim, all of Taejeon, Rep. of Korea

[73] Assignee: Korea Kumbo Petrochemical Co., Ltd., Seoul, Rep. of Korea

[21] Appl. No.: 09/114,842

[22] Filed: Jul. 14, 1998

[30] Foreign Application Priority Data

Aug. 27, 1997 [KR] Rep. of Korea ........................ 97-41419

[51] Int. Cl.$^6$ ........................ C08F 12/08; C08F 212/08
[52] U.S. Cl. ........................ 525/333.3; 525/88; 525/95; 525/191; 525/192; 525/197; 525/198; 525/242; 525/250; 525/331.9
[58] Field of Search ........................ 525/333.3, 88, 525/95, 191, 192, 197, 198, 242, 250, 331.9

[56] References Cited

U.S. PATENT DOCUMENTS 4,096,203  6/1978  St. Clair .............................. 260/876 B

FOREIGN PATENT DOCUMENTS

WO 89/08128  9/1989  WIPO .
WO 94/22931  10/1994  WIPO .
WO 95/12644  5/1995  WIPO .

OTHER PUBLICATIONS

"The Effect of SI Diblock in SIS Block Copolymer on Pressure Sensitive Adhesive Properties"; Matsubara et al.; Polym. Prep. 1996, 37(2), p. 720.

"Kinetics of Polymerization of Butadiene, Isoprene, and Styrene with Alkyllithiums. Part II. Rate of Initiation"; Henry L. Hsieh; Journal of Polymer Science: Part A, vol. 3, pp. 163–172(1965).

*Primary Examiner*—Duc Truong
*Attorney, Agent, or Firm*—Perman & Green, LLP

[57] ABSTRACT

This invention relates to a process for preparing a block copolymer composition, wherein it comprises following successive steps:

a step in which a vinyl aromatic monomer is polymerized in a reactor in the presence of an inert hydrocarbon solvent and organolithium initiator until depletion of the monomer to generate a living polymer; a step in which a conjugated diene monomer is added to the above polymer to synthesize a living diblock copolymer; a step in which a portion of polymerization terminator is added to partially inactivate the living diblock copolymer; steps in which a conjugated diene monomer and aromatic vinyl monomer are sequentially added to generate a mixture of living triblock copolymer and inactivated diblock copolymer; a step in which a polymerization terminator is added to complete the reaction.

This invention has advantages of providing easy, wide-range and fine control of block copolymer compositions in a reactor via well-controlled termination reactions during the sequential block copolymerization.

12 Claims, No Drawings

PROCESS FOR THE PREPARATION OF A BLOCK COPOLYMER COMPOSITION

BACKGROUND OF THE INVENTION

1. Field of the Invention

This invention relates to a process for preparing a block copolymer compostion, and more particularly, to a process for preparing a block copolymer composition comprising a linear triblock copolymer in the type of vinyl aromatic block-conjugated diene block-vinyl aromatic block and a diblock copolymer in the type of vinyl aromatic block-conjugated diene block, said process being characterized in that some parameters such as diblock content (weight % of diblock copolymer fraction in the total block copolymer), respective molecular weight and chemical composition of triblock and diblock may be easily controlled via appropriate control of termination steps, thus obtaining desired physical properties.

2. Background of the Invention

When a block copolymer composition comprising a triblock copolymer in the type of vinyl aromatic block-conjugated diene block-vinyl aromatic block and a diblock copolymer in the type of vinyl aromatic block-conjugated diene block is intended for an adhesive use, the diblock content needs to be variously controlled depending on its use.

In applications where said block copolymer composition is used as a base resin in adhesive tapes, diblock content of the base resin controls the cohesive strength and wettability of the tape. (Polym. Prep. 1996, 37(2),720).

Accordingly, diblock content should be adjusted in an appropriate manner depending on the adhesive properties required.

As mentioned in the following there are some conventional methods which provide control of diblock content in a block copolymer composition.

The U.S. Pat. No. 4,096,203 disclosed a method to control diblock content based on appropriate control of coupling efficiency of a living diblock copolymer in the type of vinyl aromatic block-conjugated diene block-Li.

However, such method has faced some shortcomings in that a) since it is practically impossible or very difficult to freely control the coupling efficiency over 90%, especially over 95%, diblock content can be controlled in a limited range, b) preparation of a block copolymer composition with high diblock content such as 30 to 70 wt % needs a small mole percent of a coupling agent relative to the living diblock copolymer, leaving considerable amounts of a living polymer after the coupling reaction, requiring additional termination step which necessitates additional process chemicals and facilities, c) in case that some commonly available halogenated compounds are employed as coupling agents to synthesize a linear triblock copolymer, a trace amount of lithium halide such as LiCl, LiBr or LiI will remain in the resulting block copolymer composition. It has already been known that such block copolymer compositions will cause subsequently formulated hot-melt-adhesive compositions to turn brown during the process performed at high temperature of 170–180° C. It is also known that a block copolymer prepared by sequential polymerization or by coupling with epoxy resin will not cause discoloring in hot-melt processes. [WO 95/12644].

Another method of controlling the diblock content in block copolymer compositions was disclosed in such a manner that after preparing triblock and diblock copolymers in separate processes, the two copolymers are blended so as to obtain a desired diblock content [WO 89/08128].

Such method has an advantage to freely adjust the diblock content, but a large-scale blending facility is required.

More recently, a process of controlling the diblock content which does not use the methods of either coupling or blending was disclosed [WO 94/22931]. Said method modified the sequential polymerization process for the preparation of a linear triblock copolymer, where it comprises:

First step: a vinyl aromatic monomer and an organic lithium initiator are introduced into a reactor in the presence of a hydrocarbon solvent and reacted until the vinyl aromatic monomer is sufficiently polymerized;

Second step: A conjugated diene monomer is added to the above polymer and reacted until the mixture is sufficiently polymerized, thus synthesizing a living block copolymer in the type of vinyl aromatic block-conjugated diene block-Li;

Third step: Simultaneously both organolithium initiator and conjugated diene monomer are added to the above polymer solution and reacted until the mixture is sufficiently polymerized;

Fourth step: a vinyl aromatic monomer is added to the above polymer solution, thus obtaining copolymer product containing a triblock copolymer in the type of vinyl aromatic block-conjugated diene block-vinyl aromatic block-Li and a diblock polymer in the type of conjugated diene block-vinyl aromatic block-Li;

Fifth step: When the vinyl aromatic monomer is sufficiently polymerized, the reaction is completed with the addition of a polymerization terminator.

Some disadvantages of the above method have been recognized in that a) in the case of obtaining a composition with higher diblock content, the addition of relatively small amounts of initiator in the first ste,and difficult control of molecular may be responsible for prolonged reaction time, and b) since the rate of second initiation reaction which controls the uniformity of the diblock formation depends on the efficiency of organolithium initiator, a widely used initiator such as n-butyllithium, which is slower than sec-butyllithium in initiation reaction, may not be desirable in some conditions.

SUMMARY OF THE INVENTION

An object of this invention is to provide a process for preparing a block copolymer composition being characterized in that a) without using the conventional methods of coupling, blending or additional charge of initiator, the diblock content of the resulting block copolymer composition may be freely controlled, b) the accurate control of diblock content may be possible in a wider range, and c) irrespective of initiator, it is easy to control the uniformity of the diblock, thus providing better control of properties of the block copolymer composition.

To fulfill the above object, the process for preparing a block copolymer composition according to this invention has the following successive steps comprising:

A step in which a vinyl aromatic monomer is polymerized in an inert hydrocarbon solvent in the presence of organolithium initiator until depletion of the monomer, thus synthesizing a living polymer; a step in which a conjugated diene monomer is added and polymerized until depletion of the monomer, thus synthesizing a living diblock copolymer; a step in which a polymerization terminator is added so as to partially inactivate the living diblock copolymer; a step in which a conjugated diene monomer is further added and polymerized until depletion of the monomer; a step in which a vinyl aromatic monomer is further added and polymerized until depletion of the monomer; a step in which a polymerization terminator is added to complete the reaction.

DETAILED DESCRIPTION OF THE INVENTION

This invention is explained in more detail as set forth hereunder.

This invention relates to a process for preparing a block copolymer composition with controlled diblock content via partial inactivation of the living diblock copolymer by adding a portion of polymerization terminator during sequential polymerization of triblock copolymer. This process enables precise control of the diblock content in a wider range by proper control of the amount of the polymerization terminator added in the above partial inactivation step. Furthermore, since the initiator is added just once in the initial stage of the process, there is no complication of non-uniform generation of diblock copolymer due to slow initiation of conjugated diene monomer by certain initiators in the middle of the polymerization process. Therefore with this invention, it is easy to control the polydispersities of the diblock copolymer in terms of molecular weight and monomer composition.

The polymerization steps for preperation of block copolymer compositions according to this invention are explained in more detail as set forth hereunder.

As the first step, a vinyl aromatic monomer is polymerized in an inert hydrocarbon solvent in the presence of an organolithium initiator until depletion of the monomer. It will be appreciated that "until depletion of the monomer" hereafter represents "until >99% of the monomer is used up in the polymerization reaction".

A vinyl aromatic monomer used for this invention includes one or more monomers selected from the following group: styrene, a-methylstyrene, o-methylstyrene, p-methylstyrene, p-tert-butylstyrene and 1,3-dimethylstyrene. It is most preferred to select styrene.

Also, the inert hydrocarbon solvent intended for polymerization includes some commonly known solvents normally used in anionic polymerization. More specifically, cyclic aliphatic hydrocarbon solvents such as cyclohexane or cyclopentane nd linear aliphatic hydrocarbon solvents such as n-hexane or n-heptane may be employed. It is preferred to select cyclohexane, a mixture of cyclohexane and n-hexane and a mixture of cyclohexane and n-heptane.

The organolithium initiator includes some commonly known ones normally used in anionic polymerization. It is preferred to select n-butyllithium or sec-butyllithium.

As the second step, a conjugated diene monomer is added to the above living polymer and polymerized until depletion of the monomer, thus synthesizing a living diblock copolymer in the type of vinyl aromatic block-conjugated diene block-Li.

Here, the conjugated diene monomer may be any of those monomers with 4 to 8 carbon atoms. More specifically, conjugated diene monomers used for this invention include one or more monomers selected from the following group: 1,3-butadiene, 2-methyl-1,3-butadiene, 2,3-dimethyl-1,3-butadiene, 1,3-pentadiene and 1,3-hexadiene. It is preferred to select 1,3-butadiene or 2-methyl-1,3-butadiene, and it is most preferred to select 2-methyl-1,3-butadiene especially for adhesive applications.

As the third step, a polymerization terminator is added so as to partially inactivate the diblock living polymer and to adjust the ratio between vinyl aromatic block-conjugated diene block-H and vinyl aromatic block-conjugated diene block-Li [first termination reaction].

Here, the polymerization terminator includes alcohols, phenols, organic acids, inorganic acids, water, ketones, aldehydes, epoxides, imines and any other compounds that can terminate the living anionic polymer. It is preferred to select alcohols or organic acids.

By changing the molar ratio of the terminator to the living diblock copolymer from 0:1 to 1:1, it is possible to obtain polymer compositions with diblock content from 0 to 100 wt %. Practically, it is readily realizable to precisely control the diblock content in the range of 5 to 95 wt %. More specifically for the adhesives application, it is preferred that the amount of the terminator added should be adjusted in such a manner that the diblock content in the final block copolymer composition is in the range of 5 to 70 wt %.

As the fourth step, a conjugated diene monomer is further added to the polymerization mixture and polymerized until depletion of the monomer to give mixtures of viny aromatic block-conjugated diene block-H and vinyl aromatic block-conjugated diene block-conjugated diene block'-Li. Here the same or different type of conjugated diene monomer from the one used in the second step may be used. All the conjugated diene monomers described in the second steps may also be used in this step.

Based on this invention, the molecular weight of triblock and diblock may be independently controlled by varying the relative amount of added conjugated diene monomer in the second and fourth steps.

As the fifth step, a vinyl aromatic monomer is added to the polymerization mixture and polymerized until depletion of the monomer to give a mixture of a living triblock copolymer in the type of vinyl aromatic block-conjugated diene block-vinyl aromatic block'-Li and an inactivated diblock copolymer bn the type of vinyl aromatic block-conjugated diene block-H.

As the final sixth step, polymerization process is completed by adding a polymerization terminator to give a mixture of vinyl aromatic block-conjugated diene block-H and vinyl aromatic block-conjugated diene block-vinyl aromatic block'-H [second termination reaction]. Here the same or different type of terminator from the one used in the first termination reaction (the third step) may be used. All the polymerization terminators described in the second steps may also be used in this step.

Since the conjugated diene block-conjugated diene block' can be regarded as a single conjugated diene block, the vinyl aromatic block-conjugated diene block-conjugated diene block'-vinyl aromatic block' can be regarded as a triblock copolymer.

Each step of the polymerization reaction may be performed under the same or different temperature conditions; under constant temperature or adiabatic condition. The allowable reaction temperature is in the range of −10 to 150° C., preferred temperature is in the range of 10 to 100° C.

The block copolymer prepared from the above steps comprises a mixture containing a triblock copolymer in the type of vinyl aromatic block-conjugated diene block-vinyl aromatic block' and a diblock copolymer in the type of vinyl aromatic block-conjugated diene block. While the molecular weight of the first vinyl aromatic block in the triblock copolymer is the same as that in the diblock copolymer because the two blocks are generated in the same polymerization step, the molecular weight of the second vinyl aromatic block (vinyl aromatic block') in the triblock copolymer may be the same or different from the first one; the molecular weight ratio between the two vinyl aromatic blocks may be adjusted in the range of 0.9 to 1.1, and it is preferred to have the range of 0.95 to 1.05. Further, the molecular weight of the conjugated diene block in the diblock copolymer is the same or different from half the value of that in the triblock copolymer; molecular weight ratio between respective conjugated diene block in the diblock and triblock copolymer may be adjusted in the range of 0.45 to 0.55, and it is preferred to be controlled within the range of 0.47 to 0.53.

Vinyl aromatic content of triblock and diblock copolymer may be controlled from 10 to 95 wt %. It is preferred to be controlled in the range of 10 to 50 wt. %; it is most preferred to be controlled in the range of 10 to 35 wt % to maintain appropriate adhesive properties.

The molecular weight of the vinyl aromatic block is not necessarily of any specific value, it may be in the range of 5,000 to 30,000; it is preferred to be in the range of 8,000 to 20,000 to have reasonable adhesive properties.

The molecular weight of the triblock copolymer may be in the range of 50,000 to 400,000 and it is preferred to be in the range of 80,000 to 250,000.

This invention isexplained by the following examples in more detail as set forth hereunder but is not limited by such examples.

EXAMPLE 1

A block copolylmer composition with target styrene content of 15 wt % for both di- and triblock copolymers and target diblock content of 10 wt % was prepared in the following process comprising;

In a 2L autoclave equipped with a mechanical stirrier, 960 g of cyclohexane and 10.6 g of styrene were admixed, and 1.02 mmol of sec-butyllithium was added to the mixture at 50° C. to initiate the polymerization. Reaction was allowed to proceed until depletion of the monomer, The temperature was raised up to 60° C. and 59.8 g of 2-methyl-1,3-butadiene was added to the autoclave and the reaction was allowed to proceed until depletion of the monomer;

0.19 mmol of methanol was added and the reaction mixture was stirred for 10 minutes;

Then, 49.0 g of 2-methyl-1,3-butadiene was introduced into the autoclave and the reaction was allowed to proceed until depletion of the monomer;

8.6 g of styrene was subsequently introduced into the autoclave at 80° C. and the reaction was allowed to proceed until depletion of the monomer;

Then, 0.83 mmol of methanol was introduced into the autoclave, stirred for 20 minutes to terminate all of the living polymeric anion.

EXAMPLE 2

A block copolylmer composition with target diblock content of 45 wt % was prepared in the following process comprising;

In a 2L autoclave equipped with a mechanical stirrier, 960 g of cyclohexane and 13.9 g of styrene were admixed, and 1.20 mmol of sec-butyllithium was added to the mixture at 50° C. to initiate the polymerization. Reaction was allowed to proceed until depletion of the monomer;

Then, the temperature was raised up to 60° C. and 78.8 g of 2-methyl-1,3-butadiene was added to the autoclave and the reaction was allowed to proceed until depletion of the monomer;

Then 0.74 mmol of methanol was added, and the reaction mixture was stirred for 10 minutes;

Then, 30.0 g of 2-methyl-1,3-butadiene was introduced into the autoclave and the reaction was allowed to proceed until depletion of the monomer;

5.3 g of styrene was subsequently introduced into the autoclave at 80° C. and the reaction was allowed to proceed until depletion of the monomer;

Then, 0.46 mmol of methanol was introduced into the autoclave, stirred for 20 minutes to terminate all of the living polymeric anion.

EXAMPLE 3

A block copolylmer composition with target diblock content of 31 wt % was prepared in the following process comprising;

In a 2L autoclave equipped with a mechanical stirrier, 960 g of cyclohexane and 12.5 g of styrene were admixed, and 1.14 mmol of n-butyllithium was added to the mixture at 50° C. to initiate the polymerization. Reaction was allowed to proceed until depletion of the monomer;

Then, the temperature was raised up to 60° C. and 70.7 g of 2-methyl-1,3-butadiene was added to the autoclave and the reaction was allowed to proceed until depletion of the monomer;

Then, 0.53 mmol of methanol was added, and the reaction mixture was stirred for 10 minutes;

Then, 38.1 g of 2-methyl-1,3-butadiene was introduced into the autoclave and polymerized until depletion of the monomer;

6.7 g of styrene was subsequently introduced into the autoclave at 80° C. and the reaction was allowed to proceed until depletion of the monomer;

Then. 0.61 mmol of methanol was introduced into the autoclave, stirred to complete the reaction.

As for the block copolymers prepared in the above examples, analytical results obtained from gel permeation chromatography (GPC) using polystryene standards are shown in Table 1.

TABLE 1

| | Weight ratio between triblock and diblock | Molecular weight of triblock | Molecular weight of diblock | Mw/Mn(1) of diblock |
|---|---|---|---|---|
| EXAMPLE 1 | 89.5:10.5 | 207700 | 99400 | 1.02 |
| EXAMPLE 2 | 55.8:44.2 | 235000 | 113000 | 1.04 |
| EXAMPLE 3 | 68.6:31.4 | 222000 | 105000 | 1.04 |

NOTES)
(1)Molecular weight distribution of diblock copolymer

As shown in the analytical results in table 1, control of diblock content in a wide range could be realized with ease.

As noted in EXAMPLE 3 where n-butyllithium was employed instead of sec-butyllithium, molecular weight distribution as narrow as in the case using sec-butyllithium was observed in the diblock copolymer. According to a previously reported paper (J. Polym. Sci., A3, 163 (1965)), n-butyllithium is a especially slow initiator for conjugated diene monomers, wider molecular weight distribution is generally expected for a conjugated diene polymer initiated by n-butyllithium. However, by using this invention which does not involve any initiation of conjugated diene, such complications can be avoided.

The process of preparing block copolymer compositions via well controlled terminations as described in this invention has recognized following advantages; a) in the case of preparing a composition with high diblock content, there is a benefit of short reaction time and easier control of molecular weight in the first step, due to a high living anionic concentration in the first step; b) in the case of preparing a composition with very low diblock content, the desired composition can be easily obtained by simple reduction of polymerization terminator so that its composition may be precisely adjusted; c) since the initiation reaction is performed just once in the first step of polystyrene block formation, the formation of the conjugated diene block is not complicated with any initiation reaction so that it is easy to control the polydispersity of diblock copolymer, thus providing better control of properties of the block copolymer composition.

What is claimed is:

1. A Process for preparing a block copolymer composition comprising the following successive steps:

(1) a step in which a vinyl aromatic monomer and organolithium initiator are introduced into a reactor in the presence of an inert hydrocarbon solvent and polymerized until depletion of the monomer;

(2) a step in which a conjugated diene monomer is added to the polymerization mixture and polymerized until depletion of the monomer;

(3) a step in which a polymerization terminator is added to the polymerization mixture to partially inactivate the living polymer;

(4) a step in which a conjugated diene monomer is added to the polymerization mixture and polymerized until depletion of the monomer;

(5) a step in which a vinyl aromatic monomer is added to the polymerization mixture and polymerized until depletion of the monomer;

(6) a step in which a polymerization terminator is added to the polymerization mixture so as to complete the reaction.

2. The process for preparing a block copolymer composition according to claim 1, wherein said inert hydrocarbon solvent includes cyclohexane, cyclopentane, n-hexane, n-heptane and mixtures thereof.

3. The process for preparing a block copolymer composition according to claim 1, wherein said organolithium initiator includes n-butyl lithium and sec-butyl lithium.

4. The process for preparing a block copolymer composition according to claim 1, wherein said vinyl aromatic monomer includes styrene.

5. The process for preparing a block copolymer composition according to claim 1, wherein said conjugated diene monomer includes 1,3-butadiene, 2-methyl-1,3-butadiene and mixtures thereof.

6. The process for preparing a block copolymer composition according to claim 5, wherein said conjugated diene monomer includes 2-methyl-1,3-butadiene.

7. The process for preparing a block copolymer composition according to claim 1, wherein the amount of said polymerization terminator added in the partial inactivation of the living diblock copolymer is cotrolled in such a manner that the diblock content in the final polymer composition is in the range of 5 to 95 wt %.

8. The process for preparing a block copolymer composition according to claim 1, wherein the amount of said polymerization terminator added in the partial inactivation of the living diblock copolymer is cotrolled in such a manner that the diblock content in the final polymer composition is in the range of 5 to 70 wt %.

9. The process for preparing a block copolymer composition according to claim 1, wherein the molecular weight ratio between respective conjugated diene block in the diblock and triblock copolymer is in the range of 0.45 to 0.55.

10. The process for preparing a block copolymer composition according to claim 1, wherein the molecular weight ratio between two vinyl aromatic blocks in a triblock copolymer is in the range of 0.9 to 1.1.

11. The process for preparing a block copolymer composition according to claim 1, wherein the block copolymer is prepared in such a manner that the vinyl aromatic content is in the range of 10 to 95 wt. %.

12. The process for preparing a block copolymer composition according to claim 1, wherein said block copolymer is prepared in such a manner that the vinyl aromatic content is in the range of 10 to 50 wt. %.

* * * * *